(No Model.) 3 Sheets—Sheet 2.

J. W. DECASTRO & T. H. MÜLLER.
APPARATUS FOR SEPARATING BODIES OF DIFFERENT SPECIFIC GRAVITIES.

No. 273,038. Patented Feb. 27, 1883.

(No Model.) 3 Sheets—Sheet 3.

J. W. DECASTRO & T. H. MÜLLER.
APPARATUS FOR SEPARATING BODIES OF DIFFERENT SPECIFIC GRAVITIES.

No. 273,038. Patented Feb. 27, 1883.

Witnesses:
Anthony Gref Jr.
Geo. H. Evans

Inventors
Jacob W. DeCastro
Teile Henry Müller
by their Attorney
E N Dickerson Jr

UNITED STATES PATENT OFFICE.

JACOB W. DECASTRO AND TEILE H. MÜLLER, OF NEW YORK, N. Y.

APPARATUS FOR SEPARATING BODIES OF DIFFERENT SPECIFIC GRAVITIES.

SPECIFICATION forming part of Letters Patent No. 273,038, dated February 27, 1883.

Application filed December 9, 1882. (No model.)

*To all whom it may concern:*

Be it known that we, JACOB W. DECASTRO and TEILE HENRY MÜLLER, of the city, county, and State of New York, have invented a new and useful Improvement in Apparatus for Separating Bodies of Different Specific Gravities, of which the following is a full, true, and exact description, reference being had to the accompanying drawings.

Our invention relates to a form of apparatus in which a removable overflow-opening is made in the bottom of a centrifugal basket for the purpose of allowing the overflow of the liquid to gradually recede from the circumference to the center during the deposit of materials—such as starch—within the basket.

Our invention will be readily understood from the accompanying drawings, of which—

Figure 1:
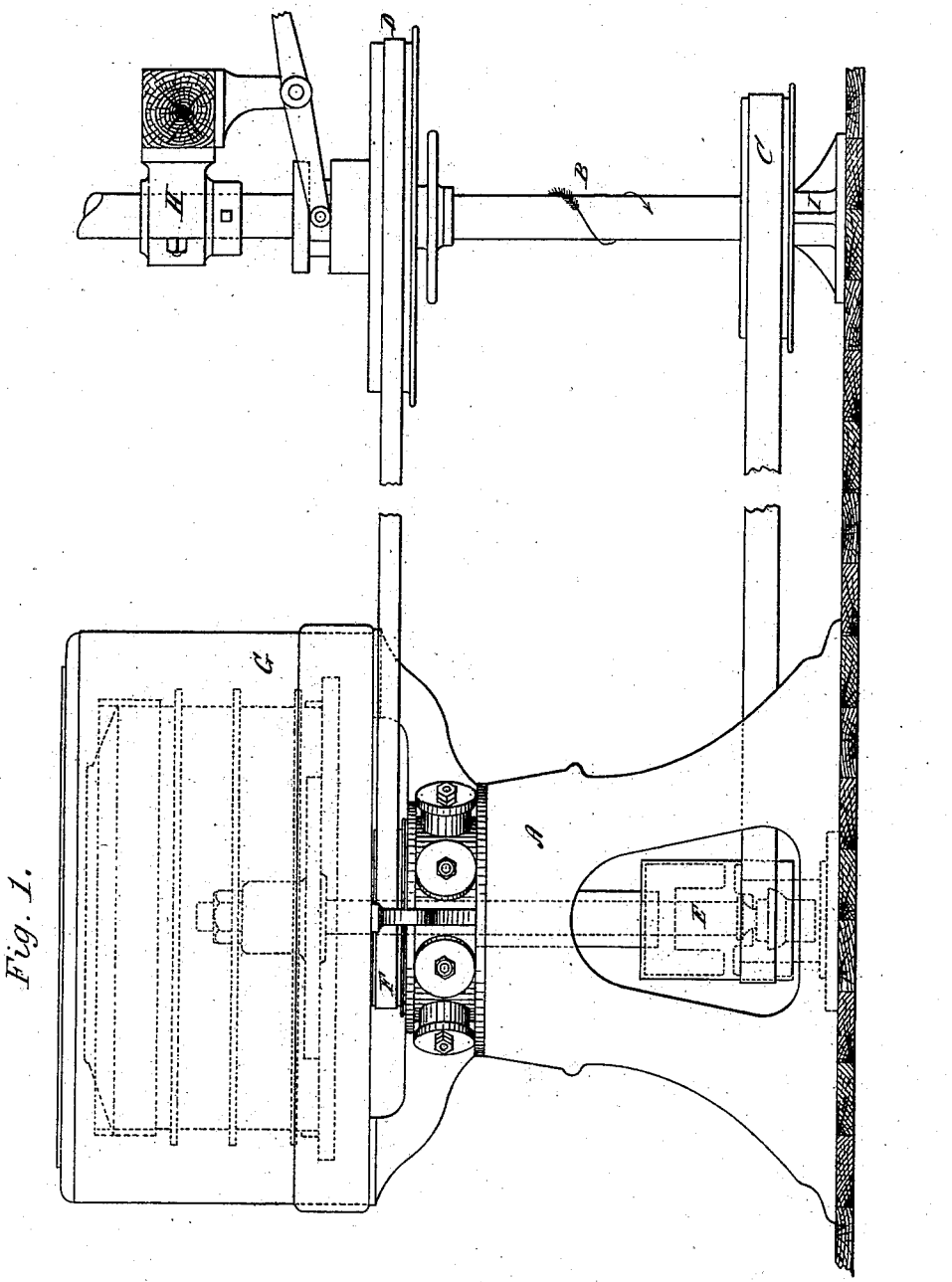
Figure 2:
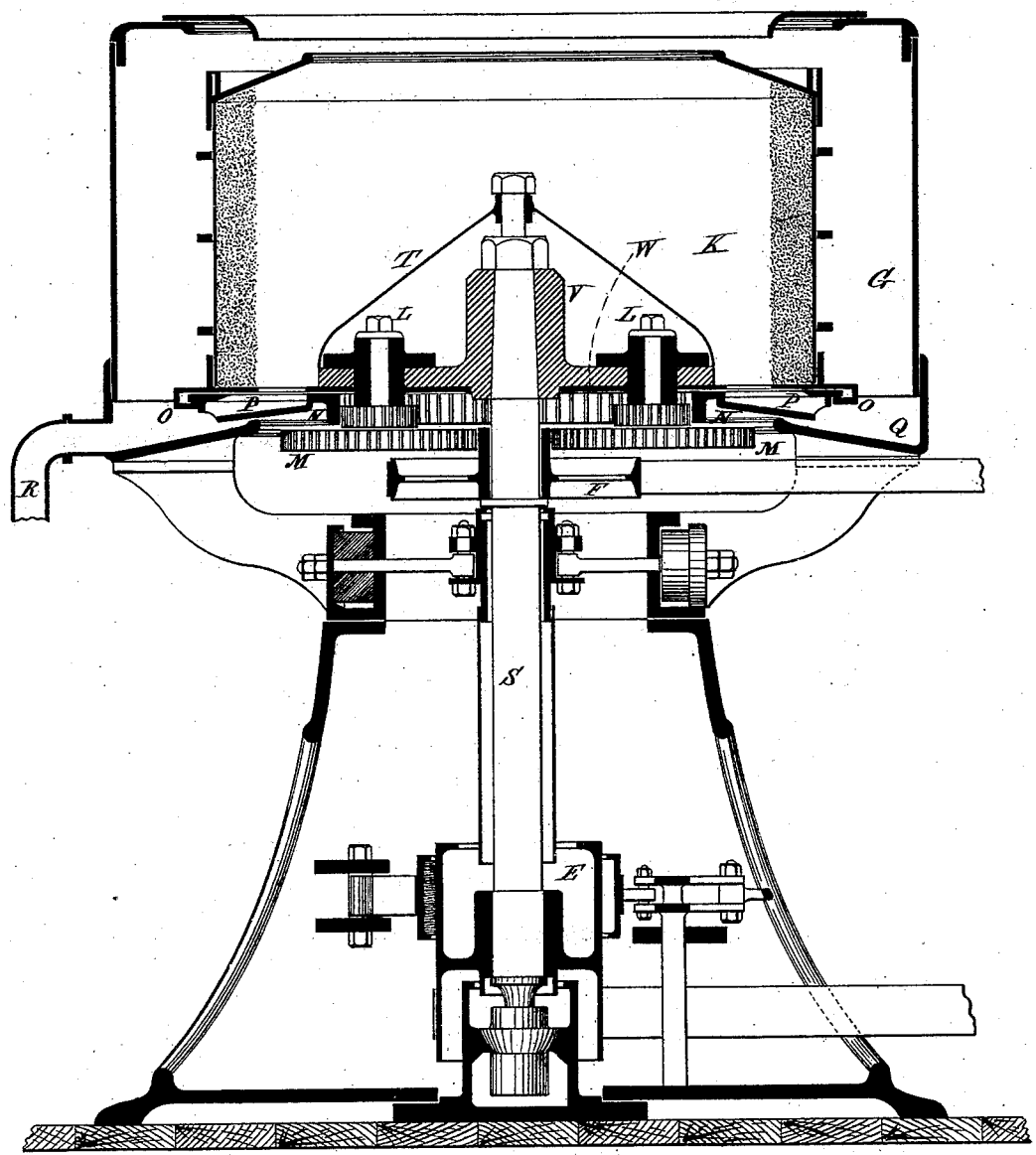
Figure 3:
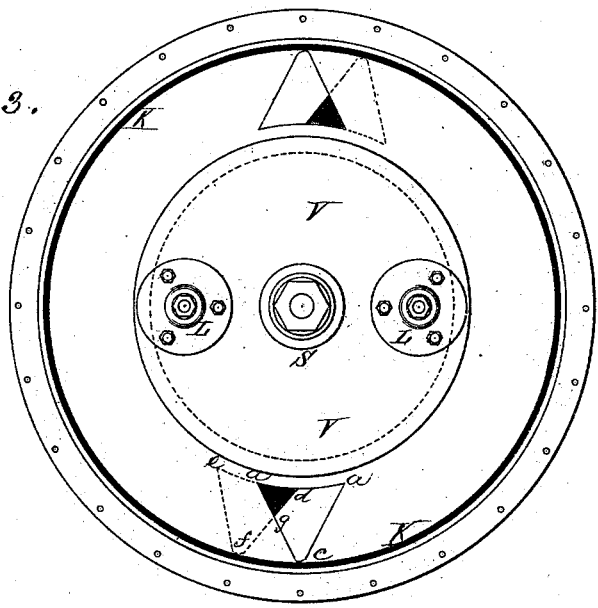

Figure 1 represents an elevation; Fig. 2, a vertical section; Fig. 3, a plan view of the bottom of the basket; and Fig. 4, a view underneath the basket, looking upward.

Figure 4:
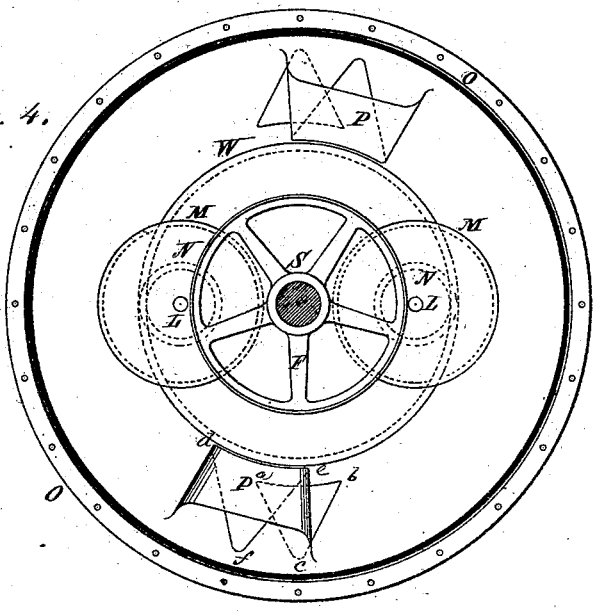

A represents the stand of a centrifugal basket, supporting a basket, K, of any suitable construction. The bottom of this basket is made of two plates—one fixed to the basket and the other lying thereon and movable thereover. These plates are provided with openings having edges inclined to each other, or to the radius of the basket, in a manner subsequently to be explained. As shown, the openings are triangular in shape. Beneath the lower plate is a pocket or channel, P. (Shown in Figs. 2 and 4.) The fixed opening in the lower plate is marked $d\,e\,f$. The movable opening is marked $a\,b\,c$. When these openings correspond there will be two openings in the bottom of the basket approaching near to the periphery. As the movable plate is turned upon the fixed plate the point of the opening will gradually recede from the periphery toward the center, as shown in Fig. 3, until finally the opening would be entirely closed. The mechanism for causing this gradual recession is shown in Figs. 1, 2, and 4. The pulley F is driven from the pulley D on the power-shaft B. The lower pulley, C, drives a pulley, E, upon said shaft through a movable clutch. On the spindle S is fastened the center V of the bottom of the basket K, which is provided with bearings for shafts L L, on which are immovably fastened the wheels M M. These wheels M M gear into an opening formed on the hub of the pulley F, and the wheels N N, also fixed upon the shafts of the wheels M M, gear into an internal-gear wheel, W, which gear-wheel W is attached to and moves the movable bottom of the basket. This movable plate, as shown in Fig. 2, is suspended beneath the fixed plate, and is provided with pockets P P, beneath the opening $d\,e\,f$, for directing the escaping liquid outward into the overflow-casing. By turning $f$, therefore, the pockets P and corresponding openings on the valve-plate may be moved with relation to the triangular openings $a\,b\,c$ of the basket, so as to open or close said openings. When the basket K is revolving, driven through the pulleys E and C, the pockets P and the openings $d\,e\,f$, acting with these pockets in the valve-plate, may receive a relative motion to the basket by making the proportions between the pulley D and the pulley F different from the proportions between the pulley E and the pulley C.

When the machine is set in rapid motion a stream of liquid having suspended therein substances to be separated is caused to fall on the drum T, which covers the shafts L L. Said liquid will be thrown toward the outer circumference of the basket, and will there arrange itself in a hollow cylinder. At the commencement of the operation the openings in the bottom of the basket $a\,b\,c$ are placed directly over the openings $d\,e\,f$, communicating with pockets P. Since, now, the apex $c$ of the triangular opening is situated almost contiguous to the wall of the basket, only a very thin film of sediment, consisting of the heaviest particles, will be formed against the sides of the basket, and the liquid will overflow through the openings, carrying with it the lighter particles, which it is not desired to deposit. On connecting the clutch shown at Fig. 1 a very slow relative motion will be given to the valve-plate, and thereby to the openings $d\,e\,f$. By doing this the sides F D of the valve and B C of the basket will overlap each other gradually at points approaching more and more nearly to the center, leaving as the actual passage for the liquid only that part of the opening which is shaded dark in Fig. 3. The effect of this is that while the opening is virtually receding from the outside of the basket the heaviest particles are gradually retained in the basket until the basket is filled. The machine is then stopped and the material removed from the basket either in its dry state or washed out, as previously described. It will be plain that it is not necessary to have the two openings of triangular shape, as any two openings which have two sides inclined at a different angle to a common radius moving relatively to each other will answer—as, for instance, a radial slit in the basket and a spiral slit in the valve-plate, or two spirals with a different central progression, or two slits corresponding to two different tangents of a spiral, or a radial slit in the valve may work together with a slit corresponding to the chord of a circle on the inside of the basket. All that is necessary is to form the two edges of the openings in the basket and valve in such a manner that the remaining part of the passage shall gradually recede toward the center of the basket.

What we claim as our invention, and desire to secure by Letters Patent, is—

1. A centrifugal machine provided with an opening through the bottom of the basket, and apparatus for causing said opening to recede from the periphery toward the center of the basket during the operation of the machine, substantially as described.

2. A basket for a centrifugal machine, having a double bottom and two openings, one in the upper and one in the under plate, said openings having edges inclined relatively to each other, substantially as described.

JACOB W. DECASTRO.
TEILE HENRY MÜLLER.

Witnesses:
GEO. H. EVANS,
WM. A. POLLOCK.